United States Patent
Poirier (10) Patent No.: US 10,454,144 B2
(45) Date of Patent: Oct. 22, 2019

(54) SYSTEM AND METHOD FOR ACOUSTIC DETERMINATION OF BATTERY CELL EXPANSION

(71) Applicant: FORD GLOBAL TECHNOLOGIES, LLC, Dearborn, MI (US)

(72) Inventor: Eric Poirier, Brownstown, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 402 days.

(21) Appl. No.: 15/156,544

(22) Filed: May 17, 2016

(65) Prior Publication Data

US 2017/0338526 A1 Nov. 23, 2017

(51) Int. Cl.
| | |
|---|---|
| *H01M 10/48* | (2006.01) |
| *H01M 2/10* | (2006.01) |
| *H01M 10/42* | (2006.01) |
| *G01B 17/04* | (2006.01) |
| *G01L 1/25* | (2006.01) |

(52) U.S. Cl.
CPC .......... *H01M 10/482* (2013.01); *G01B 17/04* (2013.01); *G01L 1/255* (2013.01); *H01M 2/1077* (2013.01); *H01M 10/4207* (2013.01); *H01M 2220/20* (2013.01)

(58) Field of Classification Search
CPC .......... H01M 10/4207; H01M 10/482; H01M 2/1077; H01M 10/441; H01M 10/1016
See application file for complete search history.

(56) References Cited

U.S. PATENT DOCUMENTS

| | | | | |
|---|---|---|---|---|
| 6,621,244 B1* | 9/2003 | Kiyomiya | .............. | B60K 6/485 318/611 |
| 9,041,321 B1* | 5/2015 | Elliott | .................... | H02P 25/032 318/114 |
| 2006/0256989 A1* | 11/2006 | Olsen | .................. | H04R 25/556 381/323 |
| 2012/0065826 A1* | 3/2012 | Kinoshita | .............. | B60L 58/10 701/22 |
| 2012/0225331 A1* | 9/2012 | Tartaglia | ............. | H01M 2/0267 429/50 |
| 2012/0286739 A1 | 11/2012 | O'Brien, Jr. et al. | | |
| 2013/0029204 A1* | 1/2013 | Khakhalev | ............ | H01M 2/347 429/158 |
| 2013/0091950 A1 | 4/2013 | Bernard | | |
| 2013/0252060 A1* | 9/2013 | Bolden | ............... | H01M 2/1077 429/100 |
| 2015/0280183 A1* | 10/2015 | Utley | .................. | H01M 2/1016 429/99 |
| 2016/0329545 A1* | 11/2016 | Zhang | .................. | H01R 13/533 |
| 2016/0351972 A1* | 12/2016 | Hsu | .................... | H01M 10/4207 |

FOREIGN PATENT DOCUMENTS

| | | | |
|---|---|---|---|
| DE | 10 2011 112641 A1 | 3/2013 | |
| DE | 10 2012 221613 A1 | 5/2014 | |

\* cited by examiner

*Primary Examiner* — Imran Akram
(74) *Attorney, Agent, or Firm* — Carlson, Gaskey & Olds (57) ABSTRACT

A battery pack according to an exemplary aspect of the present disclosure includes, among other things, a battery assembly, a resonant device disposed about the battery assembly, a bracket located between the battery assembly and the resonant device, and at least one modulating device located between the bracket and the resonant device.

19 Claims, 7 Drawing Sheets

SYSTEM AND METHOD FOR ACOUSTIC DETERMINATION OF BATTERY CELL EXPANSION

TECHNICAL FIELD

This disclosure relates to a battery testing system and method for acoustically estimating an amount of battery cell expansion and/or pressure build up inside the battery cells of an electrified vehicle battery pack.

BACKGROUND

The desire to reduce automotive fuel consumption and emissions is well documented. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack typically powers the electric machines and other electrical loads of the electrified vehicle. The battery pack typically includes a plurality of battery cells that are compressed together to a specific extent in one or more cells stacks or modules. The battery cells may expand or swell due to internal pressure build-up caused by electrolyte decomposition. Over time, this can result in battery cell degradation and associated loss of performance.

SUMMARY

A battery pack according to an exemplary aspect of the present disclosure includes, among other things, a battery assembly, a resonant device disposed about the battery assembly, a bracket located between the battery assembly and the resonant device, and at least one modulating device located between the bracket and the resonant device.

In a further non-limiting embodiment of the foregoing battery pack, the battery assembly includes a grouping of battery cells bound together by the resonant device.

In a further non-limiting embodiment of either of the foregoing battery packs, the resonant device is a compression strap.

In a further non-limiting embodiment of any of the foregoing battery packs, the resonant device is a compression rod.

In a further non-limiting embodiment of any of the foregoing battery packs, the resonant device includes a body having a cut-out section that establishes a side string.

In a further non-limiting embodiment of any of the foregoing battery packs, the side string contacts the at least one modulating device.

In a further non-limiting embodiment of any of the foregoing battery packs, the resonant device, the bracket, and the at least one modulating device are metallic structures.

In a further non-limiting embodiment of any of the foregoing battery packs, the at least one modulating device is a fret or a protrusion of the bracket and is configured in the shape of a cylindrical rod.

In a further non-limiting embodiment of any of the foregoing battery packs, the at least one modulating device includes a first modulating device and a second modulating device mounted between the bracket and the resonant device.

In a further non-limiting embodiment of any of the foregoing battery packs, a microphone and a measuring device are configured to measure a modulated acoustic response of the resonant device.

In a further non-limiting embodiment of any of the foregoing battery packs, the pack includes an emitter, a receiver, and a control unit configured to control the emitter and the receiver to monitor a modulated acoustic response to the resonant device.

In a further non-limiting embodiment of any of the foregoing battery packs, the bracket is contiguous with at least one battery cell of the battery assembly.

A battery servicing method according to another exemplary aspect of the present disclosure includes, among other things, measuring a modulated acoustic response of a resonant device of a battery assembly of a battery pack, and servicing the battery pack if a difference between the modulated acoustic response of the resonant device and a nominal acoustic response of the resonant device exceeds a predefined threshold or tolerance value.

In a further non-limiting embodiment of the foregoing battery servicing method, the method includes, prior to measuring the modulated acoustic response, exciting the resonant device to generate the modulated acoustic response.

In a further non-limiting embodiment of either of the foregoing battery servicing methods, exciting the resonant device includes manually pinching or strumming the resonant device.

In a further non-limiting embodiment of any of the forgoing battery servicing methods, exciting the resonant device includes transmitting an acoustic wave across the resonant device.

In a further non-limiting embodiment of any of the forgoing battery servicing methods, measuring the modulated acoustic response is performed with a measuring device.

In a further non-limiting embodiment of any of the forgoing battery servicing methods, measuring the modulated acoustic response is performed using a control unit mounted on-board an electrified vehicle.

In a further non-limiting embodiment of any of the forgoing battery servicing methods, servicing the battery pack includes replacing a battery cell of the battery assembly.

In a further non-limiting embodiment of any of the forgoing battery servicing methods, servicing the battery pack includes adjusting a tension of the resonant device.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details a system and method for acoustically determining an amount of cell expansion and/or internal pressure of battery cells of an electrified vehicle battery pack. An exemplary battery testing system includes an acoustically or mechanically resonant device, which is used to bind a plurality of battery cells together in a grouping, a bracket located between the battery cells and the resonant device, and at least one modulating device located between the bracket and the resonant device. An exemplary battery servicing method includes measuring a modulated acoustic response of the resonant device, and servicing the battery pack if the absolute difference between the modulated acoustic response of the resonant device and a nominal (i.e., normal) acoustic response of the resonant device exceeds a predefined threshold or tolerance value. These and other features are discussed in greater detail in the following paragraphs of this detailed description.

Figure 1:
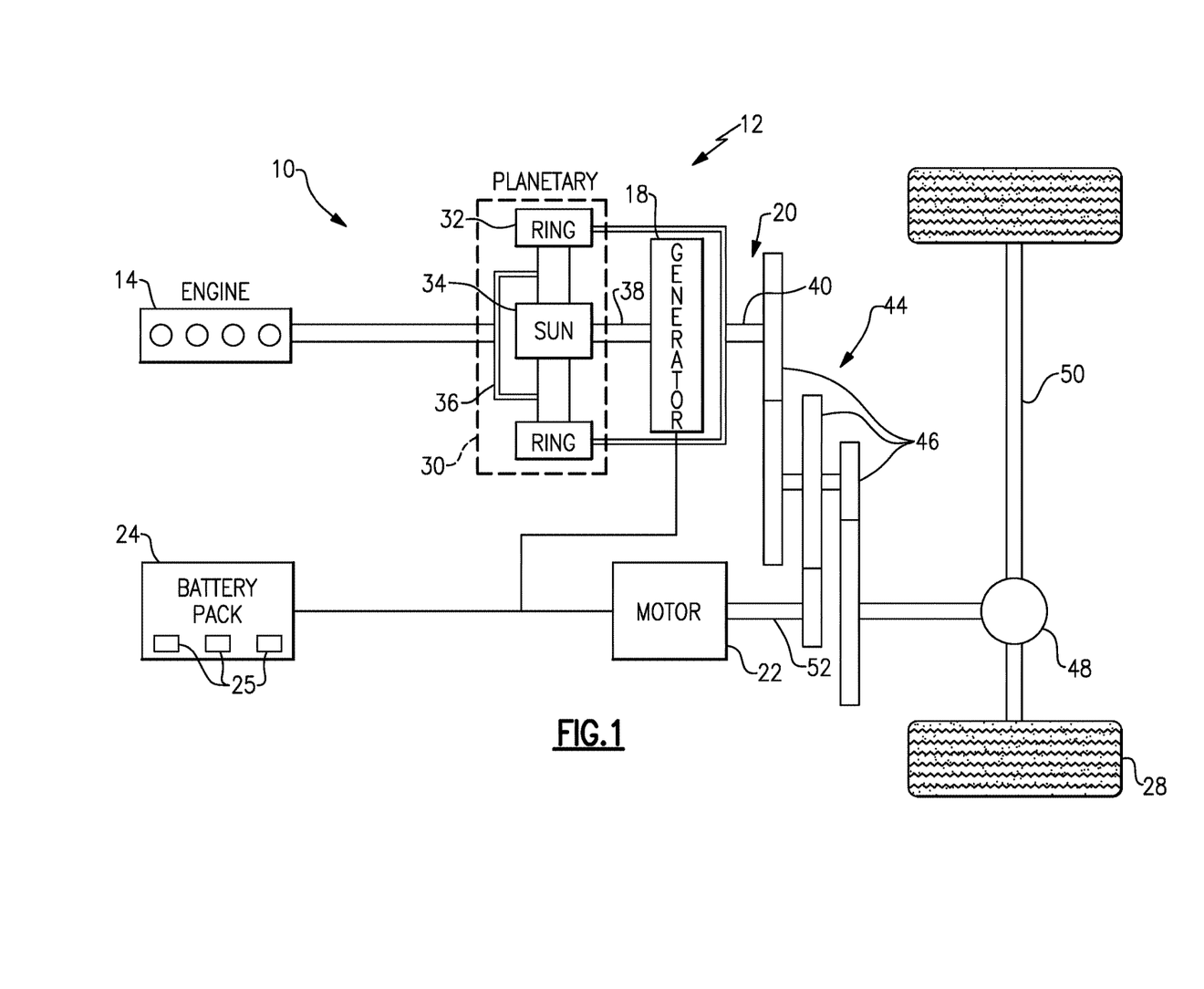
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), fuel cell vehicles, etc.

In a non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22 and/or other electrical loads of the electrified vehicle 12. Other types of energy storage devices and/or output devices could also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
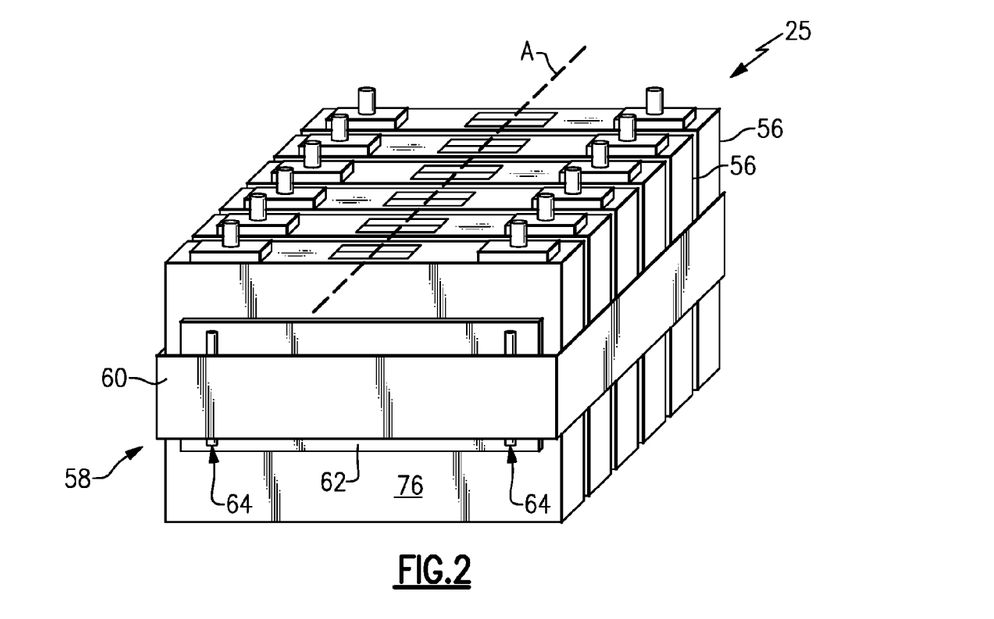
FIG. 2 illustrates a battery assembly for an electrified vehicle battery pack.

FIG. 2 illustrates an exemplary battery assembly 25 that may be employed within an electrified vehicle battery pack, such as the battery pack 24 of the electrified vehicle 12 of FIG. 1, for example. The battery assembly 25 includes a plurality of battery cells 56 for supplying electrical power to various electrical loads of the electrified vehicle 12. Although a total of six battery cells 56 is depicted in FIG. 2, the battery assembly 25 could employ a greater or fewer number of battery cells within the scope of this disclosure. In other words, this disclosure is not limited to the specific configuration shown in FIG. 2.

The battery cells 56 may be stacked side-by-side along a longitudinal axis A to construct a grouping of battery cells 56, sometimes referred to as a "cell stack." In a non-limiting embodiment, the battery cells 56 are prismatic, lithium-ion cells. However, this disclosure is not limited to prismatic cells and could extend to cells having other geometries or designs (cylindrical, pouch, etc.) and/or other chemistries (nickel-metal hydride, lead-acid, etc.).

Over time, the battery cells 56 can degrade due to cell expansion/swelling and internal pressure build-up associated with electrolyte decomposition. It is therefore desirable to monitor changes in battery cell expansion and internal pressure in order to ensure that the battery cells 56 are kept under a desired level of compression for achieving peak performance, longevity, and stability. Battery testing systems for systematically monitoring battery cell expansion and internal pressure are therefore detailed in the various embodiments described below.

A battery testing system 58 associated with the battery assembly 25 is configured to acoustically determine an amount of battery cell expansion and internal pressure build-up inside the battery cells 56. In a non-limiting embodiment, the battery testing system 58 includes a resonant device 60, a bracket 62, and one or more modulating devices 64. The battery testing system 58 may additionally include a microphone 66 (e.g., an acoustic sensor) and a measuring device 68 (see, e.g., FIG. 6A) or an emitter 90 and a receiver 92 (see, e.g., FIGS. 7A, 7B).

The resonant device 60 is disposed about the battery assembly 25. The resonant device 60 may be wrapped around the battery assembly 25 to create a grouping of the battery cells 56 that are bound together. The resonant device 60 is under tension and thus applies a compressive force to the grouping of battery cells 56. The compressive force applied by the resonant device 60 can change as a function of battery cell expansion and pressure build-up.

Figure 3:
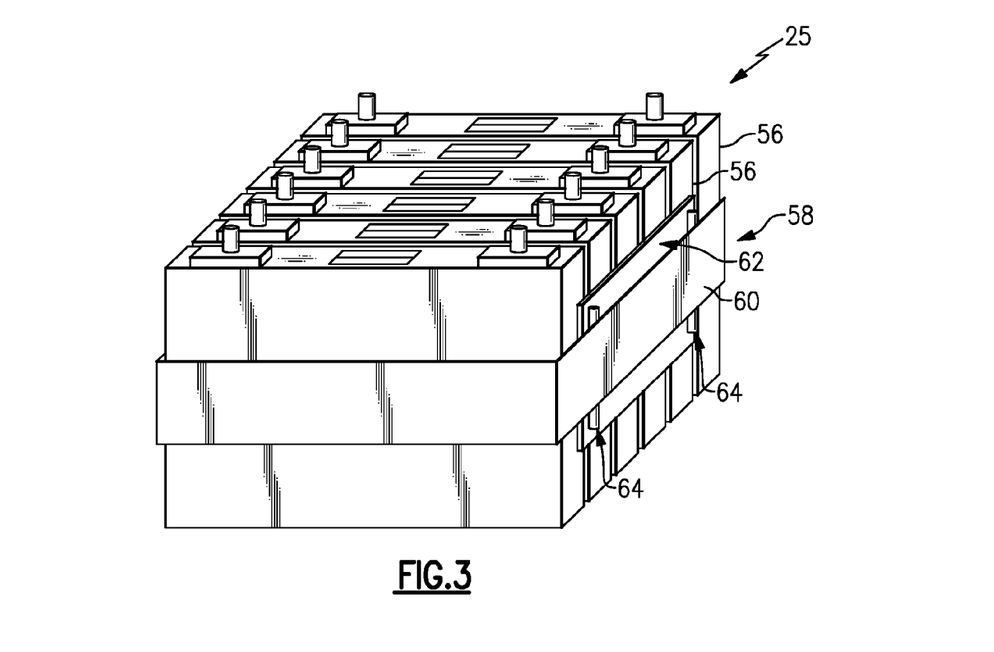
FIG. 3 illustrates another exemplary battery assembly for an electrified vehicle battery pack.
Figure 4:
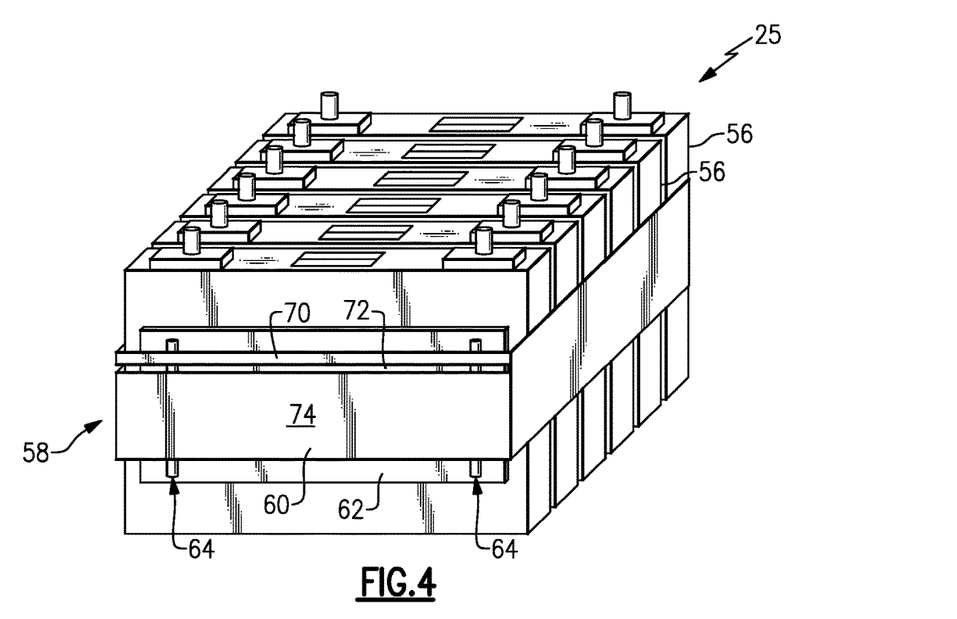
FIG. 4 illustrates another exemplary battery assembly for an electrified vehicle battery pack.
Figure 5:
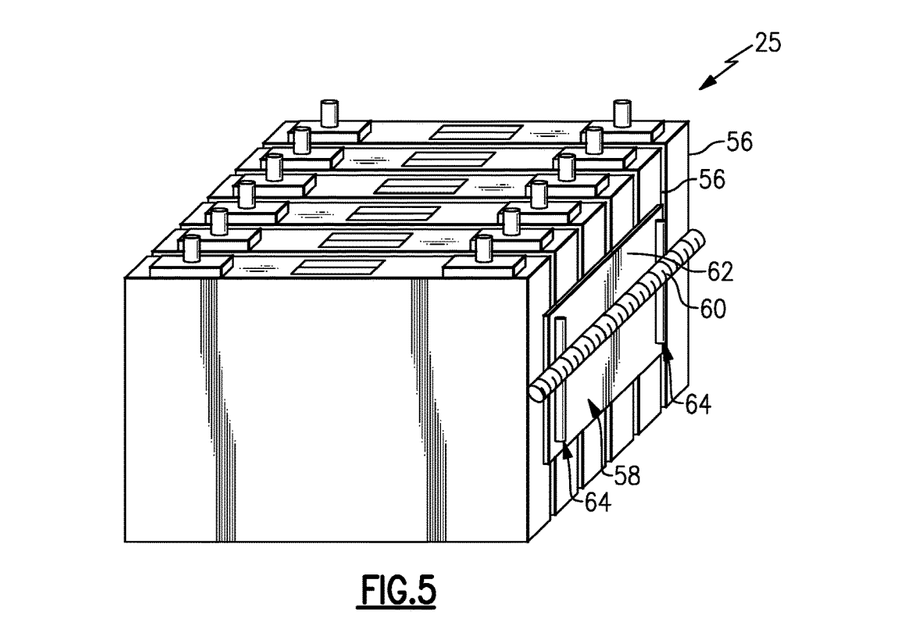
FIG. 5 illustrates yet another exemplary battery assembly for an electrified vehicle battery pack.

In a first non-limiting embodiment, the resonant device 60 is a compression strap or band (see, e.g., FIGS. 2, 3, and 4). In a second non-limiting embodiment, the resonant device 60 is a compression rod (see, e.g., FIG. 5). The resonant device 60 functions both as a structural component (for compression) and a sensing device. The resonant device 60 could be any battery pack component that exhibits a characteristic frequency that changes when subjected to a change in tension resulting from battery cell swelling and internal pressure build-up. As discussed in greater detail below, the resonant device 60 can be excited to vibrate over its natural frequency, or more generally over its resonance frequency spectrum, thus generating a specific acoustic response that can be measured to determine an amount of battery cell expansion and pressure build-up. This information can then be used to determine whether the battery pack 24 requires servicing.

In an additional non-limiting embodiment, the resonant device 60 includes a side string 70 (see, e.g., FIG. 4). The side string 70 is established by creating a cut-out section 72 in a main body 74 of the resonant device 60, in a non-limiting embodiment. The side string 70 contacts the modulating device(s) 64, and when excited, produces a specific resonance frequency. The side string 70 will generally experience the same variations in forces resulting from battery cell expansion as the main body 74 of the resonant device 60. However, the side string 70 typically results in less damping when excited, and thus may produce a more accurate frequency response. Therefore, in some embodiments, the side string 70 can be used to more precisely monitor expansions and pressure variations of the battery cells 56.

The bracket 62 is positioned between the battery assembly 25 and the resonant device 60. For example, in a non-limiting embodiment, the bracket 62 is sandwiched between the battery assembly 25 and the resonant device 60. The bracket 62 can be located on any side of the battery assembly 25. For example, in a first non-limiting embodiment, the bracket 62 is positioned at a longitudinal end of the battery assembly 25 such that it is contiguous with a face 76 of a single battery cell 56 (see, e.g., FIG. 2). In another non-limiting embodiment, the bracket 62 is positioned along a side of the battery assembly 25 such that it spans across and is contiguous with multiple battery cells 56 of the battery assembly 25 (see, e.g., FIG. 3).

One or more modulating devices 64 are located between the bracket 62 and the resonant device 60. In a non-limiting embodiment, one modulating device 64 is positioned near each of the opposing ends of the bracket 62. The modulating devices 64 can be configured as cylindrical rods, although this disclosure in not limited to such a configuration. In further non-limiting embodiments, the modulating devices 64 are separate components from the bracket 62 and are mounted (e.g., glued or welded) to the bracket 62, or could alternatively be integral components of the bracket 62. In other non-limiting embodiments, the modulating devices 64 could be configured as a fret or even a protrusion of the bracket 62.

In yet another non-limiting embodiment, the resonant device 60, the bracket 62, and the modulating device 64 are all metallic components. Non-limiting examples of suitable metallic materials include steel, nickel, bronze or various metallic alloys. In another non-limiting embodiment, the resonant device 60, the bracket 62, and the modulating device 64 are made of a combination of metallic components and polymers, e.g., nylon.

Figure 6A:
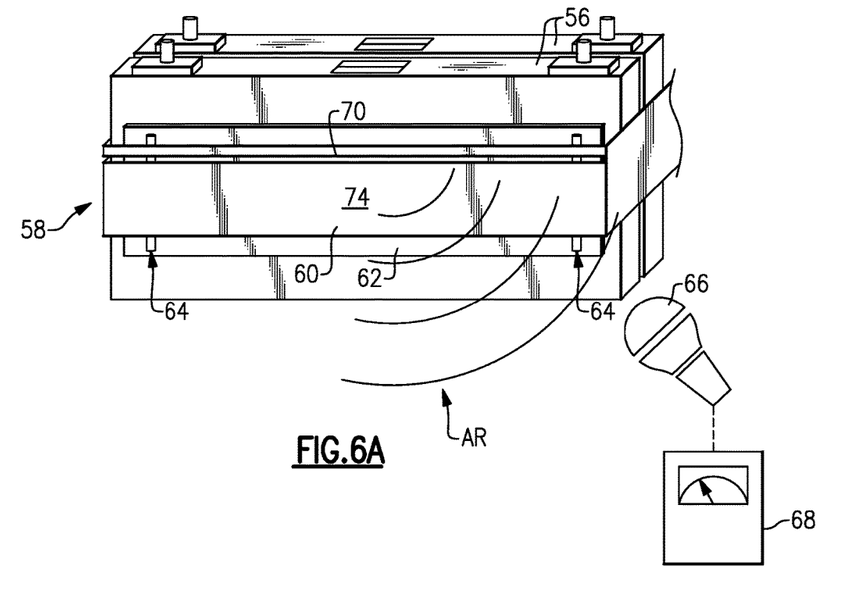
FIG. 6A graphically illustrates a battery testing system according to a first embodiment of this disclosure.

Referring now to FIG. 6A, with continued reference to FIGS. 2-5, the battery testing system 58 may be employed to acoustically determine expansion and internal pressure of the battery cells 56 of the battery assembly 25. Battery cell expansion can be indicative of an incorrect amount of tension exhibited by the resonant device 60. In this non-limiting embodiment, the battery testing system 58 includes instrumentation that can be used by a vehicle service technician during a vehicle servicing method. In other words, the battery testing system 58 of this embodiment includes instrumentation that is at least partially separate from an electrified vehicle and is thus not part of an on-board monitoring system of the electrified vehicle.

The resonant device 60 (either the main body 74 or the side string 70) may be mechanically excited, or vibrated, such as during a vehicle servicing event, to generate an acoustic response AR, or vibration response. In a non-limiting embodiment, mechanical excitation is achieved by pinching or strumming the resonant device 60, such as using a finger or a tool (e.g., metallic pick). The acoustic response AR of the resonant device 60 is modulated to a specific frequency and is amplified and modulated by the assembly of the bracket 62 and the modulating devices 64. The bracket 62 and the modulating devices 64 thus generate a strong and characteristic harmonic response upon excitation. The bracket 62 functions to evenly distribute a compressive load across the battery cells 56, and the modulating devices 64 function to modulate the vibrating frequency/acoustic response of the resonant device 60 and amplify it by reducing damping.

The acoustic response AR is sensed and converted into an audio signal by the microphone 66. The audio signal can then be measured by the measuring device 68 to determine a frequency, and optionally an amplitude, of the acoustic response AR. In a non-limiting embodiment, the measuring device 68 is an acoustic sensor. In another non-limiting embodiment, the measuring device 68 is a sonic tension meter. Other measuring devices may also be used within the scope of this disclosure. The acoustic response AR changes as a function of battery cell pressure/expansion and tension of the resonant device 60. The acoustic response AR thus can be used to assess an increase in the tension of the resonant device 60 due to battery cell expansion and/or internal pressure build-up.

Figure 6B:
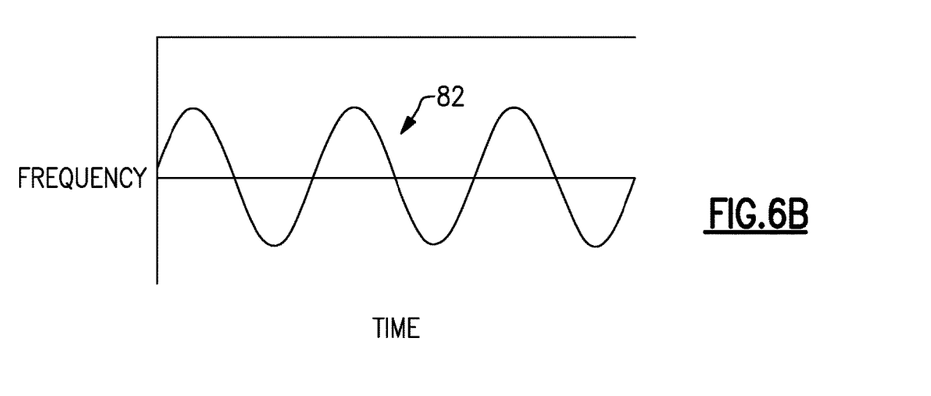
FIG. 6B graphically illustrates a nominal acoustic response of a resonant device of a battery assembly.
Figure 6C:
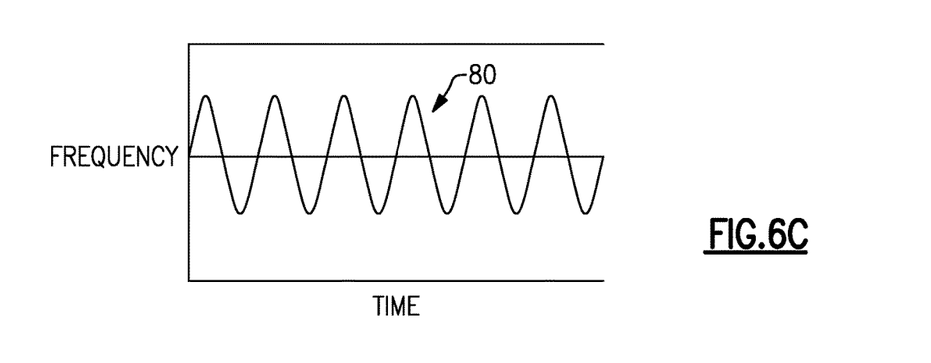
FIG. 6C illustrates a modulated acoustic response of a resonant device of a battery assembly.

FIGS. 6B and 6C graphically illustrate a nominal acoustic response 82 and a modulated acoustic response 80, respectively, of the resonant device 60 upon excitation. The nominal acoustic response 82 of FIG. 6B is the expected acoustical response of the resonant device 60 if the battery cells 56 of the battery assembly 25 are healthy (e.g., are not exhibiting greater than acceptable amounts of expansion and internal pressure) and, thus, the resonant device 60 is under an appropriate amount of tension. The nominal acoustic response 82 may be determined during manufacturing of the battery assembly 25 (i.e., at end of manufacturing line) or during engineering development phases of the battery assembly 24. In other words, the nominal acoustic response 82 is a pre-determined, reference value that a service technician can look-up and compare to the modulated acoustic response 80 to determine if a battery pack requires further servicing (e.g., battery cell replacement, band readjustment, etc.).

Figure 6D:
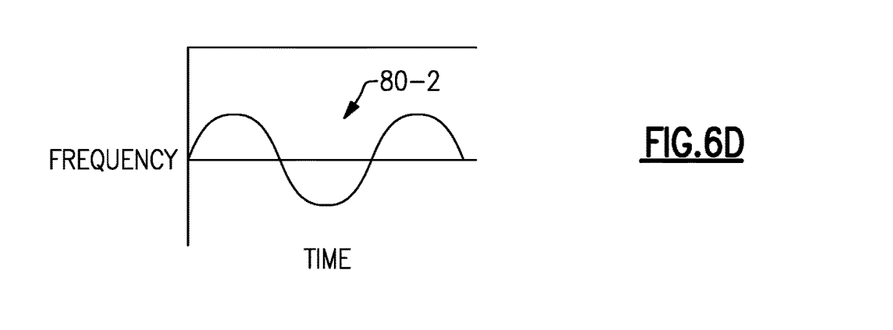
FIG. 6D illustrates another modulated response of a resonant device.

The modulated acoustic response 80 of FIG. 6C represents the acoustic response of the resonant device 60 if one or more of the battery cells 56 of the battery assembly 25 are exhibiting relatively significant amounts of expansion and internal pressure and, thus, the resonant device 60 is under an increased amount of tension. The modulated acoustic response 80 may be compared with the nominal acoustic response 82 to determine if battery cell degradation and/or mechanical changes are likely and thus further battery pack servicing is required. For example, a significant deviation (e.g., beyond a predefined threshold or outside a tolerance window) of the frequency of the modulated acoustic response 80 compared to the frequency of the nominal acoustic response 82 indicates to the service technician that the level of battery cell expansion and internal pressure inside the battery cells 56 of the battery assembly 25 has likely increased beyond an upper limit and thus further battery pack servicing is deemed necessary. Conversely, a frequency measured below a lower limit value may indicate insufficient cell compression and prompts band readjustment (see, e.g., FIG. 6D, which shows a modulated acoustic response 80-2 indicating the resonant device 60 is under low tension).

Figure 7A:
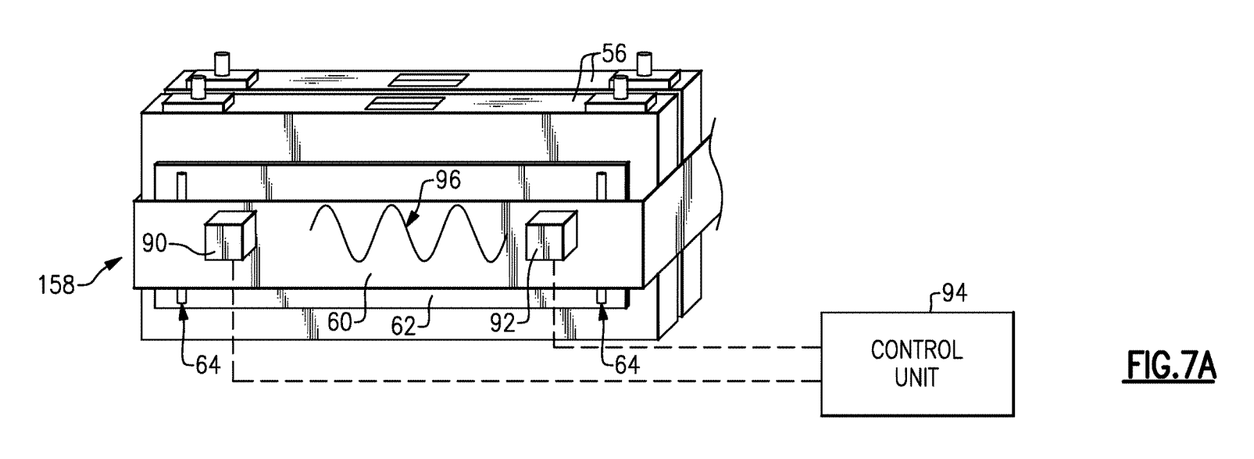
FIGS. 7A and 7B illustrate a battery testing system according to a second embodiment of this disclosure.
Figure 7B:
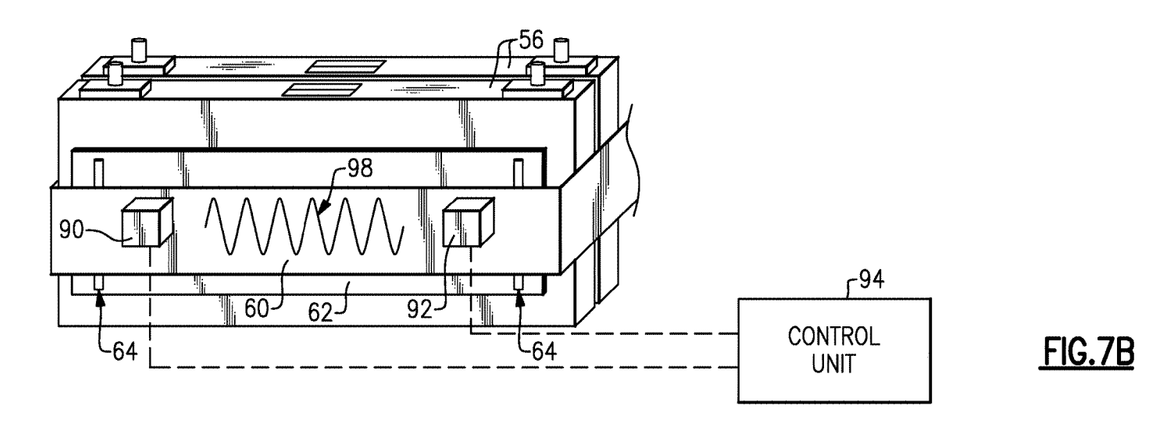

Another exemplary battery testing system 158 for acoustically monitoring expansion and internal pressure of battery cells 56 is illustrated in FIGS. 7A and 7B. In this non-limiting embodiment, the battery testing system 158 is part of an on-board monitoring system of an electrified vehicle. Thus, the battery testing system 158 can be employed to continuously monitor a battery pack of the electrified vehicle.

Like the battery testing system 58 described above, the battery testing system 158 includes a resonant device 60, a bracket 62, and one or more modulating devices 64. However, in this embodiment, the battery testing system 158 additionally includes an emitter 90, a receiver 92, and a control unit 94.

The emitter 90 and the receiver 92 are mounted to the resonant device 60. In a non-limiting embodiment, the emitter 90 and the receiver 92 are mounted on a side of the resonant device 60 that is opposite from the bracket 62 and the modulating devices 64. In another non-limiting embodiment, the emitter 90 and the receiver 92 are piezoelectric transponders.

The control unit 94 is in communication with both the emitter 90 and the receiver 92. In one non-limiting embodiment, the control unit 94 is a battery energy control module (BECM). In another non-limiting embodiment, the control unit 94 is part of an overall vehicle control unit, such as a vehicle system controller (VSC). Alternatively, control unit 94 may be a dedicated controller communicating with the BECM or the VSC. The control unit 94 is programmed with executable instructions for interfacing with and operating the various components of the battery testing system 158. The control unit 94 includes various inputs and outputs for interfacing with the various components of the battery testing system 158. In addition, although not shown, the control unit 94 may additionally include a processing unit and non-transitory memory for executing the various control strategies and modes of the battery testing system 158.

In use, the control unit 94 may command excitation of the resonant device 60 by periodically commanding the transmission of an acoustic wave from the emitter 90 to the receiver 92 along the resonant device 60. Under normal conditions, a nominal acoustic response 96 is received by the receiver 92 (see FIG. 7A). However, a change in stiffness of the resonant device 60, such as due to battery cell expansion and/or internal pressure build-up, results in a modulated acoustic response 98 received by the receiver 92 (see FIG. 7B).

The control unit 94 is configured with the necessary logic to monitor the acoustic response received by the receiver 92 and determine whether a difference between the modulated acoustic response 98 and the nominal acoustic response 96 is large enough to signify that battery cell degradation and/or mechanical changes are likely and thus further battery pack servicing is required. If so, the control unit 94 may communicate a "Service Required" message to the vehicle operator, such as by displaying the message on an interface display located inside the interior cabin of the electrified vehicle. In a non-limiting embodiment, the nominal acoustic response 96 is a pre-determined value that is stored in the memory of the control unit 94, such as within a look-up table stored in the non-transitory memory, for example. The control unit 94 may be configured to perform additional battery control tasks, including but not limited to monitoring battery pack state of charge (SOC) or voltage, for example.

Figure 8:
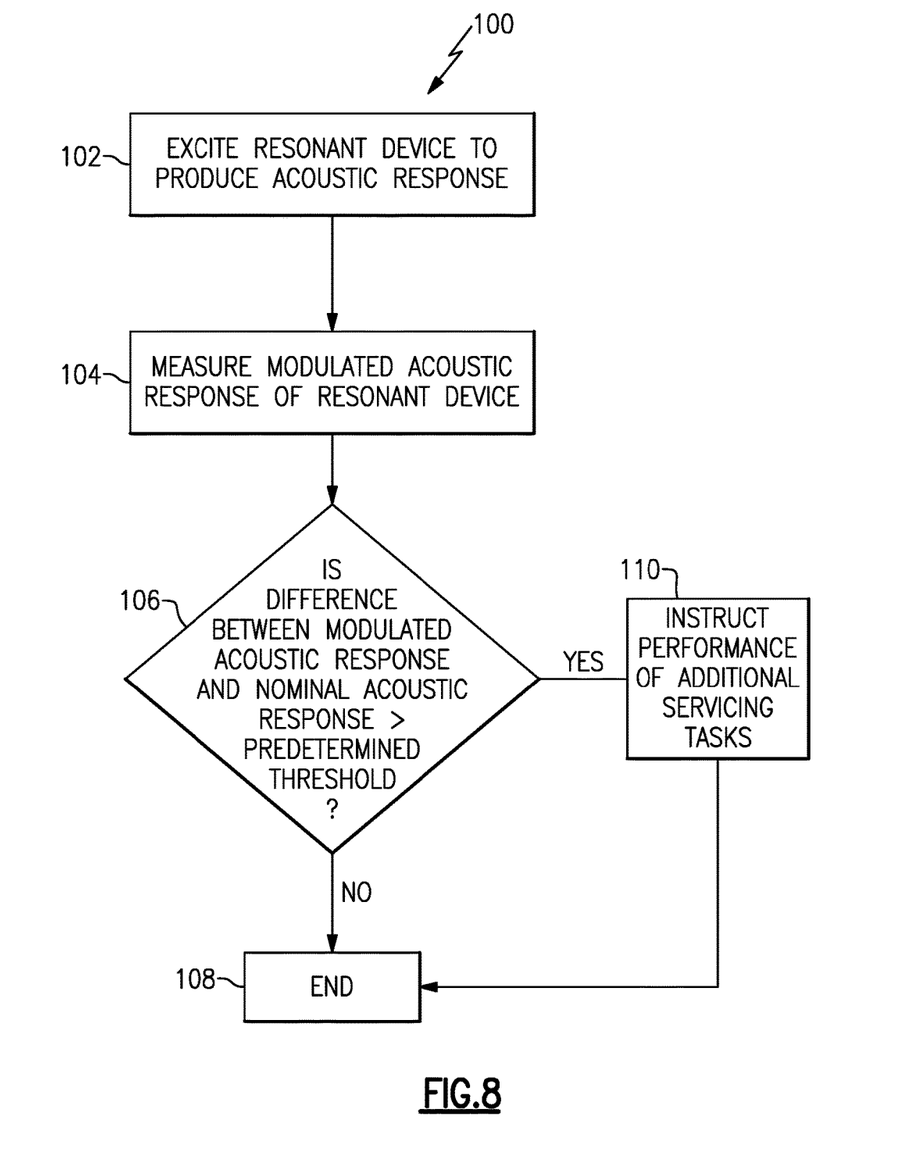
FIG. 8 schematically illustrates an exemplary battery servicing method that includes acoustically determining an amount of battery cell expansion and/or internal pressure build-up of battery cells of a battery pack.

FIG. 8, with continued reference to FIGS. 1-7B, schematically illustrates a battery servicing method 100 for determining whether to service a battery pack of an electrified vehicle. First, at block 102, the resonant device 60 of a battery testing system 58, 158 is excited to create an acoustic response. The resonant device 60 may be excited manually (see embodiment of FIG. 6A) or by communicating an acoustic wave across the resonant device 60 (see embodiment of FIGS. 7A and 7B).

Next, at block 104, a modulated acoustic response is measured by either the measuring device 68 of the battery testing system 58 or the control unit 94 of the battery testing system 158. The modulated acoustic response is compared with a pre-determined, nominal acoustic response at block 106 to determine whether a difference between the modulated acoustic response and the nominal acoustic response exceeds a predefined threshold or tolerance value. If NO, the battery servicing method 100 ends at block 108. However, if YES, the battery servicing method 100 proceeds to block 110 by instructing the technician and/or vehicle operator that additional servicing tasks are necessary. Non-limiting examples of additional servicing tasks that may be performed include replacement of highly swollen battery cells, readjustment of tension of resonant device to maintain battery cells under healthy compression state, and/or replacement of defective components at the origin of the change in cell compression.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
    a battery assembly;
    a resonant device disposed about said battery assembly and configured to generate an acoustic response when mechanically excited;
    a bracket located between said battery assembly and said resonant device; and
    at least one modulating device located between said bracket and said resonant device and configured to modulate said acoustic response,
    wherein said resonant device includes a body having a cut-out section that establishes a side string.

2. The battery pack as recited in claim 1, wherein said battery assembly includes a grouping of battery cells bound together by said resonant device.

3. The battery pack as recited in claim 1, wherein said resonant device is a compression strap.

4. The battery pack as recited in claim 1, wherein said resonant device is a compression rod.

5. The battery pack as recited in claim 1, wherein said side string contacts said at least one modulating device.

6. The battery pack as recited in claim 1, wherein said resonant device, said bracket, and said at least one modulating device are metallic structures.

7. The battery pack as recited in claim 1, wherein said at least one modulating device is a fret or a protrusion of said bracket and is configured in the shape of a cylindrical rod.

8. The battery pack as recited in claim 1, wherein said at least one modulating device includes a first modulating device and a second modulating device mounted between said bracket and said resonant device.

9. The battery pack as recited in claim 1, comprising a microphone and a measuring device configured to measure the modulated acoustic response of said resonant device.

10. The battery pack as recited in claim 1, comprising an emitter, a receiver, and a control unit configured to control said emitter and said receiver to monitor the modulated acoustic response to said resonant device.

11. The battery pack as recited in claim 1, wherein said bracket is contiguous with at least one battery cell of said battery assembly.

12. A battery servicing method, comprising:
    measuring the modulated acoustic response of the resonant device of the battery assembly of the battery pack of claim 1; and
    servicing the battery pack if a difference between the modulated acoustic response of the resonant device and a nominal acoustic response of the resonant device exceeds a predefined threshold or tolerance value.

13. The battery servicing method as recited in claim 12, comprising, prior to measuring the modulated acoustic response:
    exciting the resonant device to generate the modulated acoustic response.

14. The battery servicing method as recited in claim 13, wherein exciting the resonant device includes:
    manually pinching or strumming the resonant device.

15. The battery servicing method as recited in claim 13, wherein exciting the resonant device includes:
    transmitting an acoustic wave across the resonant device.

16. The battery servicing method as recited in claim 12, wherein measuring the modulated acoustic response is performed with a measuring device.

17. The battery servicing method as recited in claim 12, wherein measuring the modulated acoustic response is performed using a control unit mounted on-board an electrified vehicle.

18. The battery servicing method as recited in claim 12, wherein servicing the battery pack includes:
    replacing a battery cell of the battery assembly.

19. The battery servicing method as recited in claim 12, wherein servicing the battery pack includes:
    adjusting a tension of the resonant device.

* * * * *